US006249946B1

(12) United States Patent
Greenhill

(10) Patent No.: US 6,249,946 B1
(45) Date of Patent: Jun. 26, 2001

(54) REMOVAL TOOL FOR INTERNAL AND EXTERNAL RETAINING RINGS

(75) Inventor: Michael Greenhill, Highland Park, IL (US)

(73) Assignee: Small Steel Ring Company, Wheeling, IL (US)

( * ) Notice: Subject to any disclaimer, the term of this patent is extended or adjusted under 35 U.S.C. 154(b) by 0 days.

(21) Appl. No.: 09/534,278

(22) Filed: Mar. 24, 2000

(51) Int. Cl.[7] .......... B23P 19/04

(52) U.S. Cl. .......... 29/229; 29/268; 81/302

(58) Field of Search .......... 81/302, 418, 474.5; 29/229, 268

(56) References Cited

U.S. PATENT DOCUMENTS

| | | | | |
|---|---|---|---|---|
| 2,835,028 | * | 5/1958 | Wurzel | 29/229 |
| 3,305,921 | * | 2/1967 | Morse | 29/229 |
| 3,365,782 | * | 1/1968 | Madeira | 29/229 |
| 4,175,310 | * | 11/1979 | Boyd | 29/229 |
| 4,689,865 | | 9/1987 | Chamblee . | |
| 4,757,591 | | 7/1988 | Hull et al. . | |
| 5,212,859 | | 5/1993 | Hagerty . | |
| 5,943,754 | * | 8/1999 | Plite | 29/268 |

FOREIGN PATENT DOCUMENTS

| | | | | |
|---|---|---|---|---|
| 1600944 | * | 10/1990 | (SU) | 29/229 |

* cited by examiner

*Primary Examiner*—Joseph J. Hail, III
*Assistant Examiner*—Daniel Shanley
(74) *Attorney, Agent, or Firm*—Vedder, Price, Kaufman & Kammholz

(57) ABSTRACT

A tool for the one-handed removal of retaining rings includes a handle and a ring-engaging portion. The ring-engaging portion includes an engagement head that has a slot formed in it for receiving the free end of the retaining ring. The engagement head has a flat surface adjacent the slot which forms a sidewall of the slot and which serves as a lead-in surface to fit between the layers of multiple-turn retaining rings.

24 Claims, 4 Drawing Sheets

REMOVAL TOOL FOR INTERNAL AND EXTERNAL RETAINING RINGS

BACKGROUND OF THE INVENTION

The present invention relates generally to tools for removing retaining rings, and more particularly, to a tool for removing internally and externally mounted retaining rings.

Retaining rings are commonly used in various industries to retain parts either within a cylindrical bore or on a cylindrical shaft. One type of retaining ring is a spiral retaining ring formed from one or more turns of flat wire which is wound in a spiral fashion upon itself to form multiple turns. The ends of the wire may include specially cut out portions that permit the ends to be grabbed by a pliers.

It is difficult to grab the free ends of the retaining rings due to the size of the bore and the clearance of the shaft. Further difficulty is encountered in that one of the free ends must be lifted from the remainder of the ring with a blunt object such as a screw driver or a fine point object, such as a dental pick, and then grabbed by the user so that the free ends and its turn may be unwound, further unwinding results in removal of the ring from the bore or shaft groove. Often these "pry-type" tools will slip out of engagement with the free end, frustrating the user and potentially causing injury when the pry tool becomes disengaged from the ring free end.

Various tools have been developed to remove snap rings and other types of rings. One of these tools, as described in U.S. Pat. No. 4,689,865 which issued Sep. 1, 1987, has a pliers-like body with two free ends that engage the free ends of the snap ring. This tool is complex and difficult to construct. It also can only be used in a perpendicular orientation with the snap ring. A similar tool is described in U.S. Pat. No. 5,212,859 issued May 25, 1993, whereupon the free ends of the tool are engaged with the free ends of the ring and then moved apart under the urging of the handles. The user must have sufficient clearance to attach the tool and to manipulate the handles of the tool.

U.S. Pat. No. 4,175,310 issued Nov. 27, 1979, describes a snap ring removal tool that does not use a pliers-type structure and thus can be operated with one hand from either the interior or exterior of a snap ring. However, the tool must be seated against either the interior of the bore or exterior of the shaft. If this contact is not maintained during the removal of ring, the tool can slip and lose its engagement with the free end of the snap ring.

U.S. Pat. No. 4,757,591 issued Jul. 17, 1988, describes a similar rotatable snap ring removal tool that incorporates a complex clamping end that first clamps the free end of a snap ring so that it may be removed from its groove and a separate pry tool inserted between the ring end and the bore. This construction is both complex and cumbersome.

These prior art tools all have various engagement and/or clamping ends for engaging free ends of single turn rings and they could not be easily adapted to engage a free end of a multiple turn ring. The present invention is therefore directed to a removal tool that can be easily operated with one hand and that is useful with both single turn and multiple turn retaining rings and which overcomes the aforementioned disadvantages.

SUMMARY OF THE INVENTION

It is accordingly, a general object of the present invention to provide a removal tool for a retaining ring that is operable with one hand and which is easily engaged with the free end of the retaining ring.

Another object of the present invention is to provide a retaining ring removal tool useful in removing multiple turn retaining rings from either bores or shafts, whenever the retaining rings have two free ends disposed on opposite sides of a body of the ring, the removal tool having a slotted end that engages the free end of the retaining ring.

Another object of the present invention is to provide a retaining ring removal tool having a handle portion and a ring engaging portion projecting therefrom, the ring-engaging portion having a flat surface formed on the exterior thereof that enables the ring engaging portion to be slid along the ring in order to engage one of the free ends of the ring.

A still further object of the present invention is to provide a removal tool for removing retaining rings and which is capable of one-handed operation, the tool having an engagement end with a slot disposed therein for receiving a free end of a retaining ring, the tool further having a flat surface for orienting the tool in a removal position on a retaining ring, the slot being spaced apart from the flat surface by a thin sidewall portion that may be interposed between the free end and a supporting turn of the retaining ring in order to engage and hold the free end so that it may be removed from the groove in which it lies.

Yet another object of the present invention is to provide a retaining ring removal tool that facilitates the removal of either flat or waved retaining rings from grooves on either shafts or in bores, the tool being capable of one-handed operation in either a vertical or horizontal work orientation, the tool having an engagement head with a slot formed therein for receiving the free end of the retaining ring, the slot being centrally disposed in the engagement head and a portion of the engagement head being truncated to define a flat surface of the tool proximate to the slot, but separated therefrom by a thin sidewall, the sidewall defining an interposing member fitting between the free end and an adjacent turn of the retaining ring.

These objects are accomplished through the structure of the present invention. In one embodiment of the invention, the tool includes a handle and an engagement member in the form of a removable bit. The bit has an overall circular cross-section that is partially truncated at the end thereof in order to define a flat, orientation surface of the tool. This flat surface permits the tool to be placed on a corresponding opposing flat surface of a retaining ring and moved into contact with the ring free end.

The engagement end further has a slot formed in it that defines a ring-receiving opening of the engagement end. The slot is spaced proportionate to the orientation surface so that a thin, but sufficiently strong sidewall is formed between the slot and the flat surface of the bit. This thin surface serves as a lead-in surface to guide the free end of the retaining ring into the slot. The thinness of the sidewall permits it to be easily interposed between adjacent turns of the ring at the end of the retaining ring.

In another embodiment of the invention, the engagement end may constitute an enlarged head portion at the end of the bit. This enlarged head portion also has a flat surface and slot. The bit may be angled at around 90° so that it may easily engage a retaining ring free end in situations where the circumferential clearance is reduced, but where there is sufficient axial clearance from its shaft with respect to the ring and the workpiece it is on. In yet another embodiment of the invention, the handle and engagement member may be formed as a single piece and machined from a single piece of metal. The material used for the tool is preferably hard, but slightly ductile, such as S7 tool steel, that may be hardened to a Rockwell Hardness Scale C of about Rc 51 to about Rc 58.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which.

DETAILED DESCRIPTION OF THE PREFERRED EMBODIMENTS

Figure 1A:
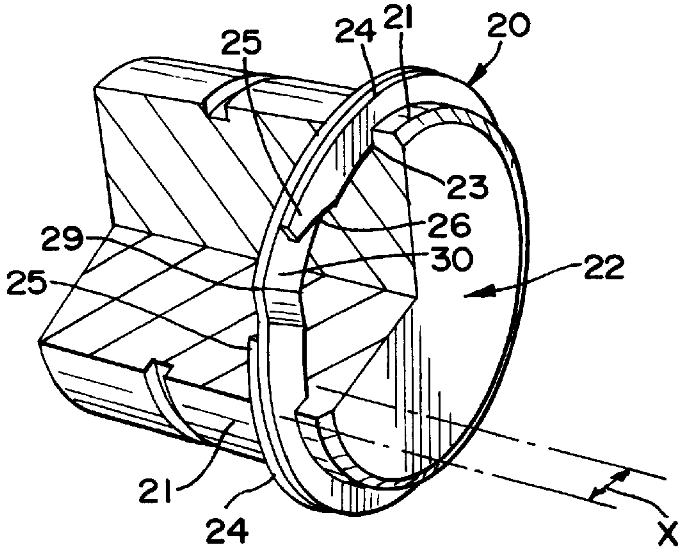
FIG. 1A is a perspective view, partially in section, of a multi-turn flat retaining ring in place upon the exterior surface of a work piece.

FIG. 1A illustrates a retaining ring 20 in place on the external surface 21 of a shaft 22. The ring 20 sits in a groove 23 formed on the shaft 22 and is commonly used to either retain the shaft 22 in place within a bore (not shown) or to retain a work element in place on the shaft 22.

The retaining ring 20 illustrated is a multi-turn retaining ring formed from a length of flat wire that is edge wound. The terms "multiple turn" or "multi-turn" as used herein refers to the number of revolutions of the flat wire that are present in the ring. In this regard, the ring 20 is shown as having two turns 24, one turn lying upon the other. The ring 20 has two free ends 25. Each of the free ends 25, as illustrated, may include radiused removal notches 26 that facilitate the removal of the ring from its groove 23, or it may have a flat end (not shown).

Figure 2A:
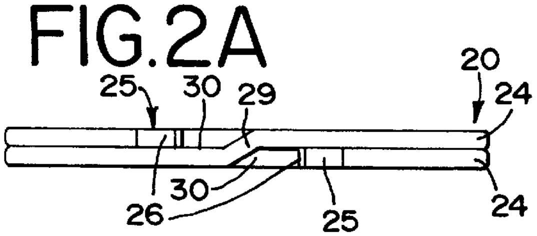
FIG. 2A is a side elevational view of a flat, multi-turn retaining ring having an offset body portion, illustrating the positions of the free ends of the ring.

The ring 20 illustrated has a crimp, or offset portion 29, that permits the ring to have a relatively constant thickness, where both turns will be parallel to each other throughout its circular extent. This is shown best in FIGS. 2A and 2C, although in these views, the radiused removal notches 26 are shown facing the exterior of the ring 20. They may also face the interior of the ring as shown in FIG. 1A. As can be seen in FIG. 2A, the ends 25, of the ring 20 are spaced apart from each other along the circular extent of the ring and they lie upon flat portions 30 that flank the offset portion 29. These flat surfaces 30 are useful in the removal of the ring 20, as explained in greater detail to follow.

Figure 2B:
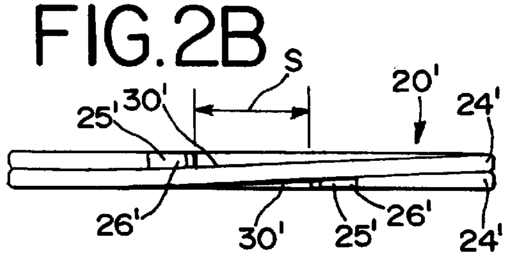
FIG. 2B is a side elevational view of a flat, multi-turn retaining ring having a flat body portion, and illustrating the positions of the free ends of the ring.
Figure 2C:
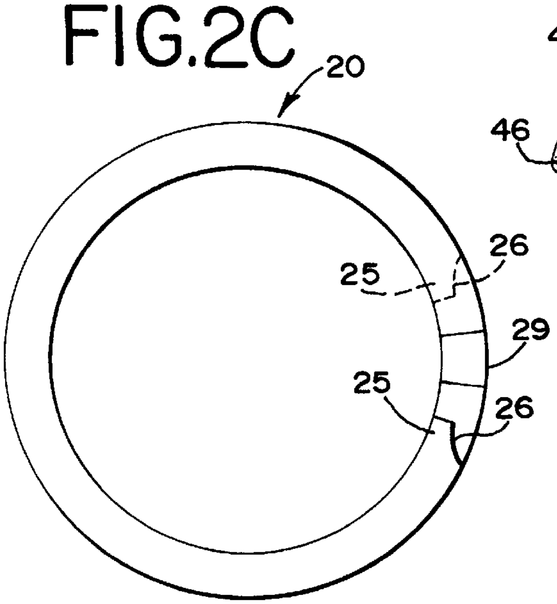
FIG. 2C is a top plan view of the retaining ring of FIG. 2A.

The flat retaining ring may also be of a non-offset style, such as is illustrated generally at 20' in FIG. 2B, where no offset is present and where the turns 24' of the ring 20' lie flat upon each other in a helical shape. The free ends 25' of the ring 20' are still preferably spaced apart from each other and are separated by a spacing S. The free ends 25' of the ring 20' lie upon the flat surfaces 30' of the ring 20'. In each such ring 20, 20' , the free ends 25, 25' have curved, or radiused removal notches 26, 26' formed in the body portions of the rings 20, 20'.

Figure 1B:
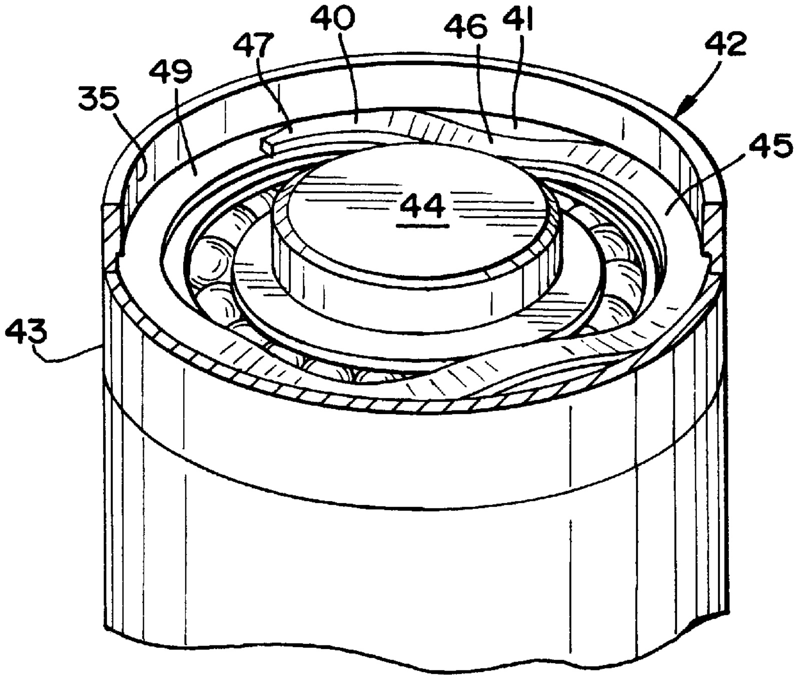
FIG. 1B is a perspective view, partially in section, with a multi-turn waved retaining ring in place along the interior surface of a work piece.
Figure 3A:
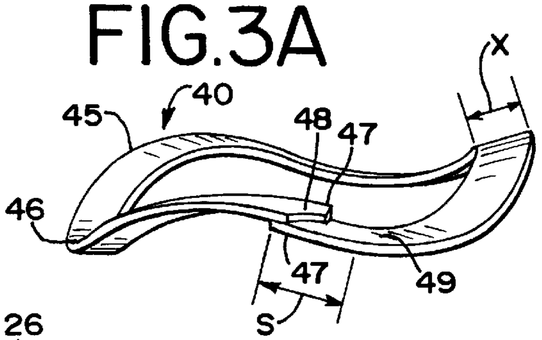
FIG. 3A is a side elevational view of a single-turn, overlapping waved retaining ring illustrating the position of the free ends of the ring.

FIG. 1B illustrates another retaining ring 40 in an internal application. In this application the ring 40 is contained within an interior groove 41 of a bore 42 in a cylindrical member 43 and it holds a work element, such as the hub and bearing assembly 44 in place within in the bore 42. In this application, the retaining ring 40 is a waved retaining ring, meaning that it has a series of waves extending around the circular path of the ring. Each wave has a pair of alternating peaks 45 and valleys 46 along its circular paths (shown best in FIG. 3A). This ring 40 is of the overlap type where the free ends 47 of the spring 40 overlap a portion 49 of a ring turn and are separated by a spacing S. FIG. 3A illustrates the waved retaining ring 40 better and it can be seen that the two free ends 47 slightly overlap each other as shown, meaning that they extend slightly over the flat portions 49. The free ends 47 have removed notches 48.

Figure 3B:
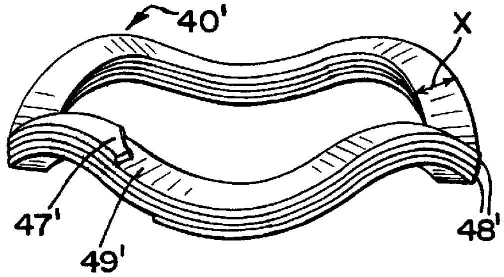
FIG. 3B is a side elevational view of a multi-turn, waved retaining ring illustrating the position of the free ends of the ring.

FIG. 3B illustrates a waved retaining ring 40' having multiple ring turns 48 that lie upon each other. The free ends 47' of the spring 40' lie on flat surface portions 49' thereof. The width of the turns of this and the other rings mentioned above is typically a constant value, X. In this style retaining ring 40', as with the others shown in FIGS. 2A–B and 3A, the rings are commonly removed from this engagement in an internal or external groove by grasping the free ends of the ring. This has been heretofore accomplished by using a screw driver, or pick, to lift one of the free ends of the ring radially outward where it may be grabbed by a pliers or similar tool.

Figure 4:
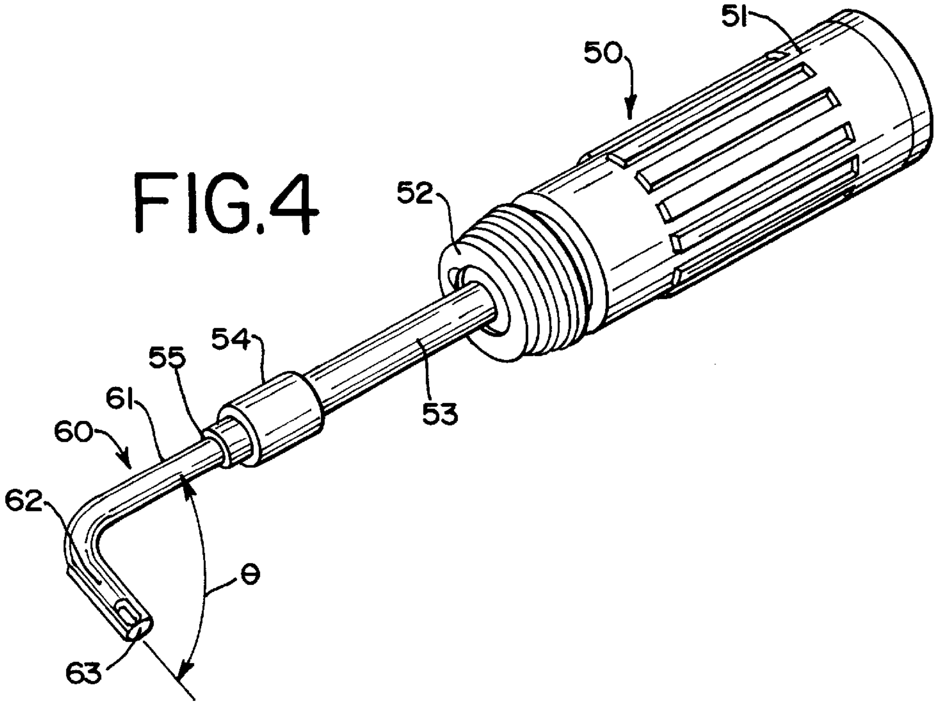
FIG. 4 is a perspective view of a retaining ring removal tool constructed in accordance with the principles of the present invention.

FIG. 4 illustrates one embodiment of a retaining ring removal tool 50 constructed in accordance with the principles of the present invention. As can be seen, the tool 50 includes a handle or body portion 51 with a collar 52 that receives a shaft 53. The shaft 53 may terminate in a slip-lock collect 54 that has an opening 55 with a spring-biased locking ball disposed therein. The collect 54 selectively releasably receives a removal bit 60, illustrated as having a shaft portion 61 and an engagement portion, or head 62, that diverges at an angle θ from the shaft portion 61. This angle is shown in the drawings as generally an angle of about 90°, but it will be understood that other angles may be suitable for use with the tool 50. This engagement portion 62 terminates in an endface 63.

Figure 8:
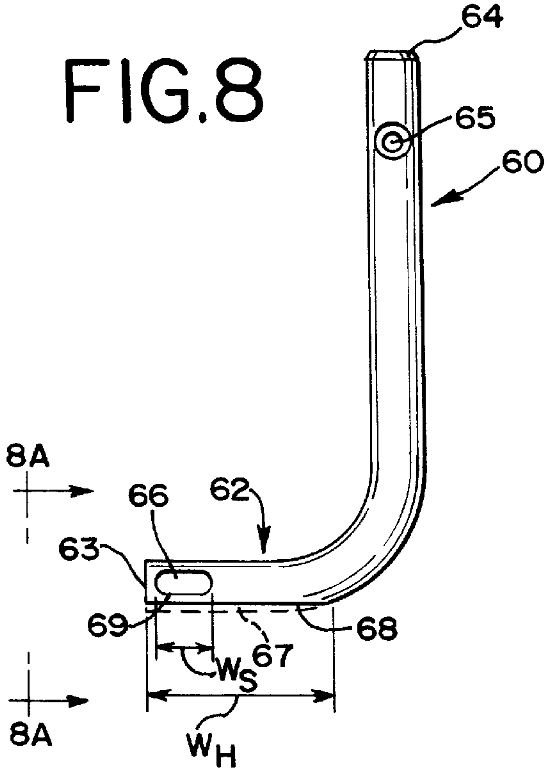
FIG. 8 is a side elevational view of another alternate bit for use with the tool of the present invention
Figure 8A:
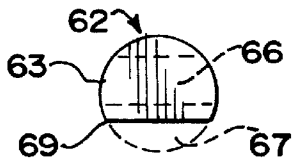
FIG. 8A is an end elevational view of the bit of FIG. 8, taken along lines 8A—8A thereof, showing the location of the removed material that forms the flat surface (sidewall) of the bit.

The bit 60 is shown best in FIG. 8 and it may include at its collet insertion end 64, a recess or bore 65 that will engage a spring-biased ball-detent mechanism (not shown) disposed within the collet 54 which holds the bit 60 in place and which prevents the bit from rotating, or twisting, during use of the tool. The bit 60 includes a slot 66 formed therein proximate to the free end 63. This slot 66 is shown as extending entirely through the body of the engagement portion 62 and is designed to receive a portion of a retaining ring 20, 20', 40 & 40' therein. The bit 60 is shown as formed from cylindrical stock and is bent to form the offset end 62. A portion 67 of the engagement end 62 may be removed as shown in order to define a flat positioning surface 68 for orienting the tool 50 and bit 60 on the flat surfaces 30, 30', 49 & 49' of the retaining rings 20, 20' and 40, 40'. In some instances as explained below, the flat endface 63 may also serve as a positioning or orienting surface. The orientation of this flat surface 68 with respect to the cylindrical stock is best shown in FIG. 8A. As seen in FIG. 8A, the flat surface 68 forms part of the outer surface of the engagement end 62 of the bit 60 and also serves to define a sidewall 69 of the slot 66.

This flat surface 68, in effect, serves to truncate the cylindrical engagement end 62 of the bit 60 and may be machined on the bit 60, such as by milling or grinding, after the ring-receiving slot 66 is formed in the bit end 62. The removal of this material forms the sidewall 69 of the bit end 62. In this regard, the flat surface 68 of the tool bit 60 may be brought close to the engagement slot 66 so that the sidewall 69 that separates the slot 66 from the flat surface 68 is relatively thin. Thicknesses on the order of from about 0.0075 inches to about 0.016 inches have been utilized for the sidewall 69. With these thicknesses, the sidewall 69 is thin enough to move between the ring turns, yet strong enough to lift the free end of the ring off of the ring turn it rests on and out of the groove in which it sits and it is believed that thicknesses between about 0.005 inches to about 0.02 inches will suffice for this application. With these thicknesses, the sidewall 69 is easily brought between a free end 25, 25' of the retaining ring and the ring turn 24 upon which it lies. The flat surface 68 of the tool bit serves to orient and position the slot 66 for proper engagement. The slot of the bit has a length $W_s$ that is less than the length $W_H$ of the flat surface, and typically, the length of the flat surface will be about one and one-half times the length of the slot.

The bits should be made of a sufficiently hard steel, such as a tool steel that is tough and strong, yet not hardened to the degree where the material becomes brittle. One grade of tool steel that has delivered suitable results is S7. S7 tool steel is used to form the bit and is then hardened to a range from about Rc51 to about Rc58 on the Rockwell Hardness Scale C. This range of hardness has proven to be desirable given the slight thickness of the sidewall 69, which ranges from between about 0.0075 to about 0.0085 inches for small tool bits. If the bit is too hard, i.e., exceeding about Rc58, an inadvertent collision of the bit with the inner sidewall or the shaft may shatter the sidewall 69. Conversely, if the bit material is too soft, i.e., less than about Rc51, the sidewall 69 may deform under the twisting action imparted to the tool, or even shear partly or entirely from the tool body.

Figure 5:
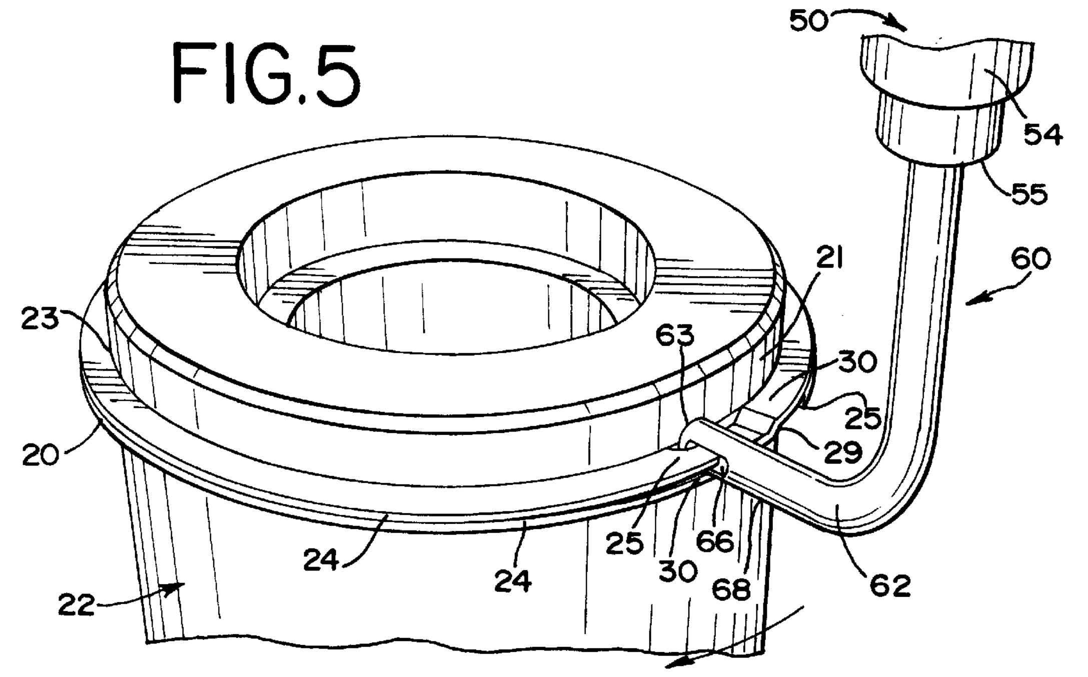
FIG. 5 is a perspective view of the tool of FIG. 4 in use with an external retaining ring and illustrating the manner of employment of the tool with the free end of the ring.

FIG. 5 illustrates the manner of engagement of the tool 50 with a retaining ring 20. The engagement end 62 of the tool 50 is placed on one of the flat portions 30 of the retaining ring 20, and in FIG. 5, the bit 60 is placed on the top side of the ring 20. The flat surface 68 of the engagement end 62 preferably has a length $W_H$ that is greater than a corresponding width of the retaining ring X on which the tool is used. In this manner, the flat surface 68 of the engagement end 62 extends past the edge of the retaining ring to ensure that the tool flat surface 68 will be properly placed on the flat portion 30 of the ring and oriented so that the ring-receiving slot 66 of the bit 60 is in opposition to the exposed free end 25 of the ring 20. The endface 63 of the engagement end 62 may be moved into contact with either the exterior surface 21 of the shaft 22, as shown in FIGS. 1A & 5, or into contact with the interior surface 35 of a bore 42. (FIG. 1B.) The bit 60 is then moved along the ring flat portion 30 until the free end 25 of the ring 20 enters the slot 66. The tool 50 is then further moved along its path as indicated by the arrow in FIG. 5, and the free end 25 of the ring is first pulled away radially outwardly from the ring turn 24 it rests upon then axially up and out of the slot groove 23. The same procedure is used to engage and remove an internal retaining ring.

The same procedure is utilized for the waved retaining rings 40, 40' of FIGS. 1B and 3A–B. The flat orienting surface 68 of the bit 60 is placed on a flat portion 49, 49' of the ring turns 48, 48' and the bit 60 is then slid into contact with the free end 47, 47' of the retaining rings 40, 40'. In instances where the free ends of the rings do not overlap as illustrated in the drawings, the endface of the tool is used to orient it. The endface is placed either against the inner bore or the shaft surface, or slightly into the ring groove so that the tool slot is in opposition to one free end of the ring, and then it is moved into engagement with the ring free end so that the ring free end enters the slot. The tool is then used to pull or twist the ring out of its groove.

Figure 6A:
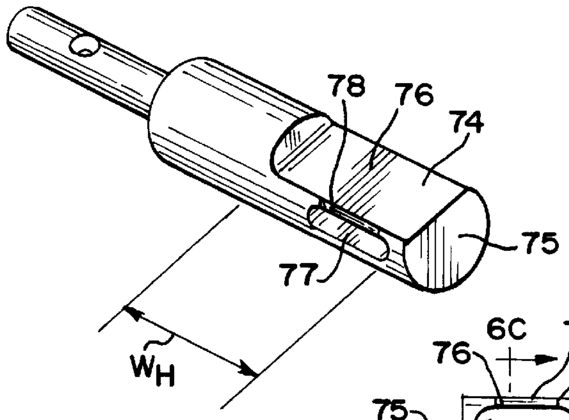
FIG. 6A is a perspective view of an alternate bit, or engagement head for use with the tool of the present invention.
Figure 6B:
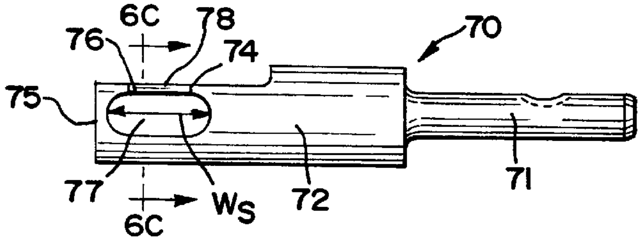
FIG. 6B is a side elevational view of the bit of FIG. 6A.
Figure 6C:
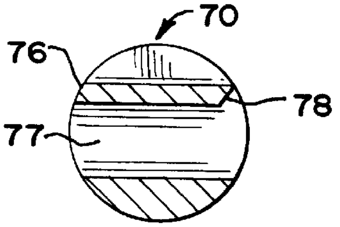
FIG. 6C is a sectional view of the bit of FIG. 6A, taken along lines 6*c*—6*c* thereof.

FIGS. 6A and 6B illustrate another embodiment of a ring removal bit 70 constructed in accordance with the principles of the present invention. This bit 20 is similar to the one described above, but it has no offset portion and, as such, it is designed to be used in situations where there is sufficient clearance on the exterior or interior of the retaining ring to hold the tool 50 in a generally horizontal orientation with respect to the retaining ring. This bit 70 has a shaft portion 71 and an enlarged engagement portion 72 (shown as having a larger diameter than the shaft portion 71) which is useful for removal of larger retaining rings. The engagement head portion 72 also has a portion 73 removed therefrom to form a flat orientation surface 74, that results in a truncated cylinder formed at the end 75 of the bit 70. This flat surface 74 defines a sidewall 76 of the ring-receiving slot 77. If desired, the sidewall 76 may include a slight ramped portion 78 at its end that facilitates the entry of the sidewall 76 between the ring free end 25 and the ring turn 24. This is best illustrated in the sectional view of FIG. 6C.

Figure 7A:
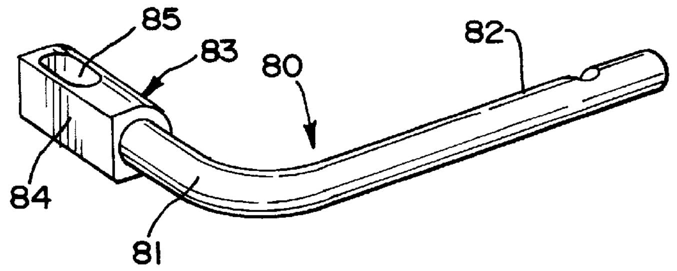
FIG. 7A is a perspective view of another alternate bit for use with the tool of the present invention.
Figure 7B:
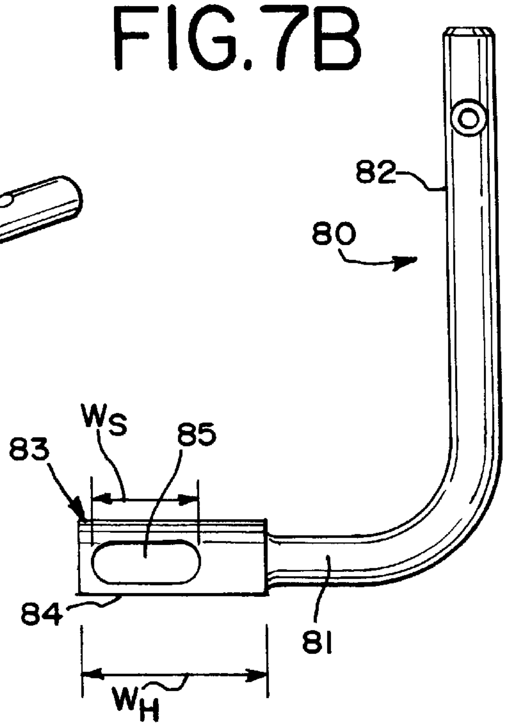
FIG. 7B is a side elevational view of the bit of FIG. 7A.

A similar enlarged head bit 80 is illustrated in FIGS. 7A and 7B, wherein the bit is bent at an offset to form an engagement portion 81 and an insertion portion 82. The engagement portion 81 has an enlarged head 83 with a flat surface 84 and a ring-receiving slot 85.

Figure 9:
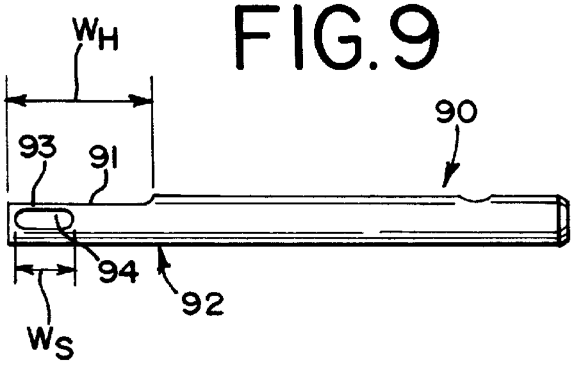
FIG. 9 is a side elevational view of still another alternate bit for use with the tool of the present invention; and, FIG. 10 is a perspective view of another embodiment of a ring removal tool constructed in accordance with the principles of the present invention in which the handle and engagement end are formed as a single piece.

A straight bit 90 similar to the bit 60 of FIGS. 4, 5 and 8 is shown in FIG. 9, and is used for horizontal engagement with the retaining ring. It too, has a machined flat surface 91 at its engagement end 92 that forms a sidewall 93 of a ring receiving slot 94.

Figure 10:
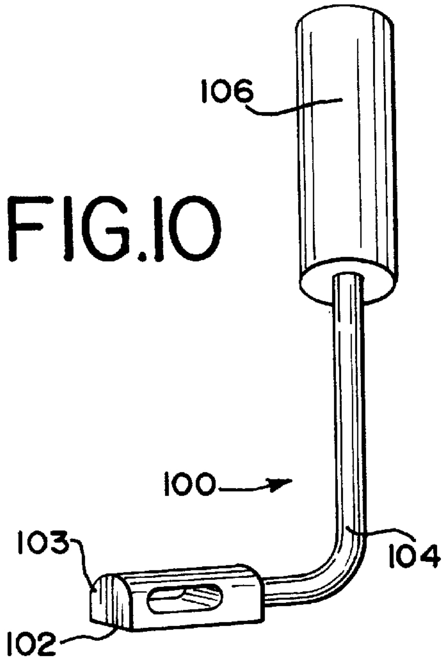

FIG. 10 illustrates yet another embodiment of a tool constructed in accordance with the present invention. In this embodiment, the tool 100 is integrally formed from a single piece of metal, such as by machining. In this embodiment, the engagement end 102 of the tool 100 may include either an enlarged head portion 103, that is disposed at the free end of the tool, or it may include a head portion of the same diameter as the tool shaft 104, similar to the embodiments of FIGS. 8 and 9. The tool 100 of FIG. 10 may have a handle portion 106 that is larger than the tool body shaft as illustrated, or the handle portion 106 and the shaft may have the same diameter.

While the preferred embodiments of the invention have been shown and described, it will be apparent to those skilled in the art that changes and modifications may be made therein without departing from the spirit of the invention, the scope of which is defined by the appended claims. For example, the engagement heads of the tools may be shapes other than cylindrical and the lead-in surface defined by the sidewalls may be slanted or ramped, and the disposition and style of the handle may also be changed.

I claim:

1. A tool for removing multiple turn retaining rings from grooves in shafts or in bores, the retaining ring being of the type that have at least more than one turn and a free end nesting upon a flat portion thereof, the tool comprising:

a handle portion for grasping by a user, a bit portion projecting out from the handle, the bit having a shaft which leads to an engagement end, the engagement end terminating in an endface, the bit including a slot formed in said engagement end, the slot extending transversely to a longitudinal axis of said engagement end and being disposed proximate to said endface, said engagement end further having a flat surface formed thereon extending along a portion of said engagement end and adjacent to said slot such that a portion of said flat surface runs along a sidewall of said slot, the flat surface providing a means for orienting said bit on said retaining ring in opposition to the free end of said retaining ring.

2. The ring removal tool of claim 1, wherein said shaft is bent at an angle such that said engagement end is offset from said handle.

3. The ring removal tool of claim 2, wherein said engagement end has a configuration of a truncated cylinder, said cylinder being truncated by said flat surface, said flat surface forming a portion of said sidewall.

4. The ring removal tool of claim 1, wherein said engagement end is formed from a cylindrical rod, the cylinder being truncated by said flat surface, said flat surface forming a portion of said sidewall.

5. The ring removal tool of claim 1, wherein said slot has a given length and said flat surface has a length that is longer than the length of said slot.

6. The ring removal tool of claim 5, wherein said length of said flat surface is about one and one half times said slot length.

7. The ring removal tool of claim 1, wherein said slot includes a ramped edge for spreading said ring free end apart from said retaining ring flat portion.

8. The ring removal tool of claim 1, wherein said engagement end includes an enlarged head portion, said slot being disposed in said enlarged head portion and said flat surface extending along at least a portion of said enlarged head portion.

9. The ring removal tool of claim 8, wherein said enlarged head portion has a length longer than a length of said flat surface, said flat surface defining a recess in said enlarged head portion.

10. The ring removal tool of claim 1, wherein said sidewall is from between about 0.005 inches to about 0.02 inches thick.

11. The ring removal tool of claim 1, further including a collet for releasably engaging said bit.

12. The ring removal tool of claim 1, wherein said handle portion, bit portion and engagement end are formed as one piece.

13. The ring removal tool of claim 12, wherein said handle portion, bit portion and engagement end are formed from a single piece of steel.

14. The ring removal tool of claim 1, wherein said bit portion is formed from a tool steel having a hardness of between 51 to about 58 on the Rockwell Hardness Scale.

15. A retaining ring removal tool for removing a circular retaining ring from a work element, the retaining ring having two free ends that are separated from each other along a circular extent of said ring by a preselected spacing, the tool comprising: a handle portion and a ring-engaging portion projecting therefrom, the ring-engaging portion having an endface having a slot disposed therein extending transversely to said ring-engaging portion longitudinal axis and spaced apart from the endface for receiving a free end of said retaining ring, said endface having a flat surface formed thereon that contacts a work element to orient said ring-engaging portion in opposition to one of the free ends of the ring, said slot receiving said retaining ring one free end when said ring-engaging portion is moved into engagement with said ring one free end.

16. A removal tool for removing retaining rings which is capable of one-handed operation, the retaining ring having multiple turns extending in a circular path and further having two free ends that lie upon said ring turns, the removal tool comprising:

an elongated cylindrical rod having an engagement portion disposed proximate to one end thereof, the engagement portion including a slot disposed therein for receiving a free end of a retaining ring, the tool further having a flat surface for orienting the tool in a removal position in opposition to a free end of said retaining ring, the slot being spaced apart from the flat surface by a thin sidewall portion that is interposed between said retaining ring free end and a turn of said retaining ring when said engagement portion is brought into contact with said retaining ring free end, such that said retaining ring free end enters said slot.

17. A tool for removing a retaining ring lying partially in a groove formed on an outer surface of a shaft or lying in a groove formed on an interior surface of a hollow bore, the retaining ring having two free ends, the two free ends lying upon each other and slightly overlapping another of said turns of said retaining ring, the tool comprising:

a handle portion disposed at one end of said tool for gripping by a user; a ring-engaging portion disposed at another end of said tool, the ring-engaging portion including a round rod having an endface that defines a working end of said tool, the rod having a slot disposed therein proximate to said rod endface, the slot having a width extending between first and second ends of said slot that is sufficient to accommodate a free end of said retaining-ring therein, said slot extending completely through said rod in a direction transverse to a longitudinal axis of said rod, said rod being partially truncated to define a flat surface extending lengthwise from said rod endface to at least said second end of said slot, the flat surface forming part of an outer surface of said rod and defining an orienting surface on said tool for orienting said tool on said retaining ring such that said slot lies in opposition to said retaining ring free end, whereby when said tool is moved toward said retaining ring free end, said retaining ring free end is received within said slot.

18. The tool as set forth in claim 17, wherein said rod has a configuration of a truncated cylinder when viewed from said rod endface.

19. The tool as set forth in claim 17, wherein said rod includes an enlarged head portion, said slot being disposed in the enlarged head portion and said flat surface being disposed on said enlarged head portion.

20. The tool as set forth in claim 17, wherein said slot is separated from said flat surface by a sidewall having a thickness of between about 0.005 inches to about 0.02 inches.

21. The tool as set forth in claim 20, wherein said sidewall thickness is between about 0.0075 to about 0.016 inches.

22. The tool as set forth in claim 17, wherein said slot includes an angled edge for guiding said retaining ring free end into said slot when said tool is brought into contact with said retaining ring free end.

23. The tool as set forth in claim 17, wherein said rod endface is flat for riding upon an outer surface of a shaft or riding upon an inner surface of a bore.

24. The tool as set forth in claim 17, wherein said slot has a preselected length and said flat surface has a length that is greater than the slot length.

* * * * *